(12) United States Patent
Lee et al.

(10) Patent No.: US 9,092,222 B2
(45) Date of Patent: Jul. 28, 2015

(54) THREE DIMENSIONAL IMAGE DISPLAY

(75) Inventors: Jae-Hoon Lee, Seoul (KR);
Byoung-Jun Lee, Cheonan-si (KR);
Hyun-Seok Ko, Cheonan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 1038 days.

(21) Appl. No.: 12/957,795

(22) Filed: Dec. 1, 2010

(65) Prior Publication Data
US 2011/0285697 A1 Nov. 24, 2011

(30) Foreign Application Priority Data
May 18, 2010 (KR) ........................ 10-2010-0046383

(51) Int. Cl.
*G09G 3/36* (2006.01)
*G06F 1/32* (2006.01)

(52) U.S. Cl.
CPC .............. *G06F 1/3265* (2013.01); *G06F 1/324* (2013.01); *Y02B 60/1217* (2013.01); *Y02B 60/1242* (2013.01)

(58) Field of Classification Search
CPC .................... G09G 2330/021; G09G 2330/02; G09G 3/3696; G06T 19/00
USPC ......... 345/1–2, 3.3–3.4, 27, 87–88, 104, 156, 345/169, 204, 214, 419–420, 664, 665, 345/211; 348/554–558
See application file for complete search history.

(56) References Cited

U.S. PATENT DOCUMENTS

| 6,456,268 | B1 | 9/2002 | Takeda | |
| 6,489,941 | B1 * | 12/2002 | Inage et al. | 345/98 |
| 7,342,561 | B2 | 3/2008 | Hiraki et al. | |
| 8,432,348 | B2 * | 4/2013 | Matsumoto et al. | 345/98 |
| 2004/0217935 | A1 * | 11/2004 | Jeon et al. | 345/100 |
| 2007/0242068 | A1 * | 10/2007 | Han et al. | 345/427 |
| 2008/0106328 | A1 * | 5/2008 | Diamond | 327/544 |
| 2009/0009508 | A1 | 1/2009 | Koo et al. | |
| 2009/0284455 | A1 | 11/2009 | Jung | |
| 2011/0205522 | A1 * | 8/2011 | Snow et al. | 356/5.01 |
| 2013/0256672 | A1 * | 10/2013 | Kimura | 257/59 |

FOREIGN PATENT DOCUMENTS

| JP | 2001013930 | 1/2001 |
| JP | 2004086146 | 3/2004 |
| JP | 2007286623 | 11/2007 |
| KR | 100374375 | 2/2003 |
| KR | 100778449 | 11/2007 |

(Continued)

*Primary Examiner* — Robin Mishler
*Assistant Examiner* — Mansour M Said
(74) *Attorney, Agent, or Firm* — Cantor Colburn LLP

(57) ABSTRACT

A three-dimensional ("3D") image display includes a signal controller which receives two-dimensional ("2D") image information and 3D image information and generates control signals based on the 2D image information and the 3D image information, a clock generator which receives the control signals from the signal controller and generates a first clock signal corresponding to the 3D image information and a second clock signal corresponding to the 2D image information, and a gate driver which generates a gate-on voltage based on at least one of the first clock signal and the second clock signal, where a frequency of the second clock signal is lower than a frequency of the first clock signal and an amplitude of the second clock signal is less than an amplitude of the first clock signal.

20 Claims, 10 Drawing Sheets

(56) References Cited

FOREIGN PATENT DOCUMENTS

| KR | 1020080011889 | 2/2008 |
| KR | 1020080045498 | 5/2008 |
| KR | 1020080060681 | 7/2008 |
| KR | 1020090004181 | 1/2009 |
| KR | 100893616 | 4/2009 |
| KR | 100894368 | 4/2009 |
| KR | 1020090120359 | 11/2009 |

* cited by examiner

THREE DIMENSIONAL IMAGE DISPLAY

This application claims priority to Korean Patent Application No. 10-2010-0046383, filed on May 18, 2010, and all the benefits accruing therefrom under 35 U.S.C. §119, the content of which in its entirety is herein incorporated by reference.

BACKGROUND OF THE INVENTION 1. (a) Field of the Invention

A three-dimensional ("3D") image display is provided.

2. (b) Description of the Related Art

In the art of 3D image display technology, a 3D appearance of an object is generally represented using binocular parallax. Binocular parallax is the main cause of 3D appearance perception at close range. That is, different two dimensional ("2D") images are seen by the left eye and the right eye. Hereinafter, an image seen by the left eye is referred to as a "left eye image" and an image seen by the right eye is referred to as a "right eye image." A left eye image and a right eye image are transmitted to the brain, which combines the left eye image and the right eye image to perceive them as a 3D image having depth information.

A 3D image display device typically uses binocular parallax. Generally, different types of 3D image displays include different types of 3D image display techniques, such as a stereoscopic type using glasses, e.g., shutter glasses and polarized glasses, and an autostereoscopic type in which a lenticular lens, a parallax barrier and/or others are disposed in a display, wherein such autostereoscopic type displays do not use glasses.

The shutter glasses type 3D image display typically uses a 3D image display method in which a 3D image display continuously outputs separate left and right eye images and left and right eye shutters of shutter glasses are selectively opened and closed such that a 3D image is displayed.

To drive high-definition 3D images, it would be generally beneficial to develop a gate driver with high-speed processing. Accordingly, research for minimizing heat and power consumption of a 3D image display are being carried out.

BRIEF SUMMARY OF THE INVENTION

General inventive concepts relate to a 3D image display in which heat and power consumption of a 3D image display is substantially reduced while providing a gate driver with high-speed processing.

In one exemplary embodiment, a three-dimensional ("3D") image display includes a signal controller which receives two-dimensional ("2D") image information and 3D image information and generates control signals based on the 2D image information and the 3D image information, a clock generator which receives the control signals from the signal controller and generates a first clock signal corresponding to the 3D image information and a second clock signal corresponding to the 2D image information, and a gate driver which generates a gate-on voltage based on at least one of the first clock signal and the second clock signal, where a frequency of the second clock signal is lower than a frequency of the first clock signal and an amplitude of the second clock signal is less than an amplitude of the first clock signal.

In one exemplary embodiment, the signal controller may receive a three-dimensional enable signal which is maintained at a high level while the signal controller receives the 3D image information.

In one exemplary embodiment, the control signals may include a first clock enable signal, a second clock enable signal, a first clock control signal and a second clock control signal, the clock generator may generate the first clock signal based on the first clock enable signal and the first clock control signal and generate the second clock signal based on the second clock enable signal and the second clock control signal, and a frequency of the second clock control signal may be lower than a frequency of the first clock control signal. Only one of the first clock enable signal and the second clock enable signal may have a high level value during one time interval.

In one exemplary embodiment, an electric charge sharing time of the first clock signal and an electric charge sharing time of the second clock signal may be substantially identical to each other. A rising edge of the first clock enable signal may occur when the first clock control signal has a low level value, and a rising edge of the second clock enable signal may occur when the second clock control signal has a low level value. The electric charge sharing time of the first clock signal may correspond to a time period between a falling edge of the first clock control signal and a rising edge of the first clock enable signal, and the electric charge sharing time of the second clock signal may correspond to a time period between a falling edge of the second clock control signal and a rising edge of the second clock enable signal. A ratio of a first falling time of the first clock control signal to a first rising time of the first clock control signal may be greater than a ratio of a second falling time of the second clock control signal to a second rising time of the second clock control signal.

In one exemplary embodiment, the 2D image information may include a still image information and a moving image information, the second clock signal may correspond to the moving image information, the clock generator may further generate a third clock signal corresponding to the still image information, and a frequency of the third clock signal may be lower than a frequency of the second clock signal.

In one exemplary embodiment, the control signals may include a first clock enable signal, a second clock enable signal, a third clock enable signal, a first clock control signal, a second clock control signal and a third clock control signal, the clock generator may generate the first clock signal based on the first clock enable signal and the first clock control signal, generate the second clock signal based on the second clock enable signal and the second clock control signal and generate the third clock signal based on the third clock enable signal and the third clock control signal, and a frequency of the second clock control signal may be lower than a frequency of the first clock control signal. Only one of the first clock enable signal, the second clock enable signal and the third clock enable signal may have a high level value during one time interval.

In one exemplary embodiment, an amplitude of the second clock signal and an amplitude of the third clock signal may be substantially identical to each other. An amplitude of the third clock signal may be less than an amplitude of the second clock signal.

In one exemplary embodiment, an electric charge sharing time of the first clock signal, an electric charge sharing time of the second clock signal, and an electric charge sharing time of the third clock signal may be substantially identical to each other. A rising edge of the first clock enable signal may occur when the first clock control signal has a low level value, a rising edge of the second clock enable signal may occur when the second clock control signal has a low level value, and a rising edge of the third clock enable signal may occur when the third clock control signal has a low level value. In one exemplary embodiment, the electric charge sharing time of the first clock signal may correspond to a time period between a falling edge of the first clock control signal and a rising edge of the first clock enable signal, the electric charge sharing time of the second clock signal may correspond to a falling edge of the second clock control signal and a rising edge of the second clock enable signal, and the electric charging sharing time of the third clock signal may correspond to a falling edge of the third clock control signal and a rising edge of the third clock enable signal. A ratio of a first falling time of the first clock control signal to a first rising time of the first clock control signal may be greater than a ratio of a second falling time of the second clock control signal to a second rising time of the second clock control signal, and a ratio of a second falling time of the second clock control signal to a second rising time of the second clock control signal may be greater than a ratio of a third falling time of the third clock control signal to a third rising time of the third clock control signal.

In one exemplary embodiment, the clock generator may include a first voltage regulator which determines an amplitude of the first clock signal and a second voltage regulator which determines an amplitude of the second clock signal. The first voltage regulator may include a first resistor and a first capacitor, and the second voltage regulator may include a second resistor and a second capacitor. A resistance of the first resistor may be different from a resistance of the second resistor.

In one exemplary embodiment, the 3D image display may further include a plurality of gate lines, where the gate driver may include a plurality of stages, and each stage of the plurality of stages may be connected to an end of each of the plurality of gate lines, respectively, the plurality of stages are aligned in a first direction, and the gate driver may be integrated on a substrate. Each stage of the plurality of stages may receive a first low voltage, a second low voltage, a clock signal, a transmission signal of at least one of a previous stage of the plurality of stages and transmission signals of at least two of subsequent stages of the plurality of stages, and output a gate voltage having the first low voltage as a gate-off voltage. The second low voltage may be a voltage when the transmission signal has a low level.

BRIEF DESCRIPTION OF THE DRAWINGS

The above and other aspects and features of this disclosure will become more apparent by describing in further detail exemplary embodiments thereof with reference to the accompanying drawings, in which.

DETAILED DESCRIPTION OF THE INVENTION

Figure 1:
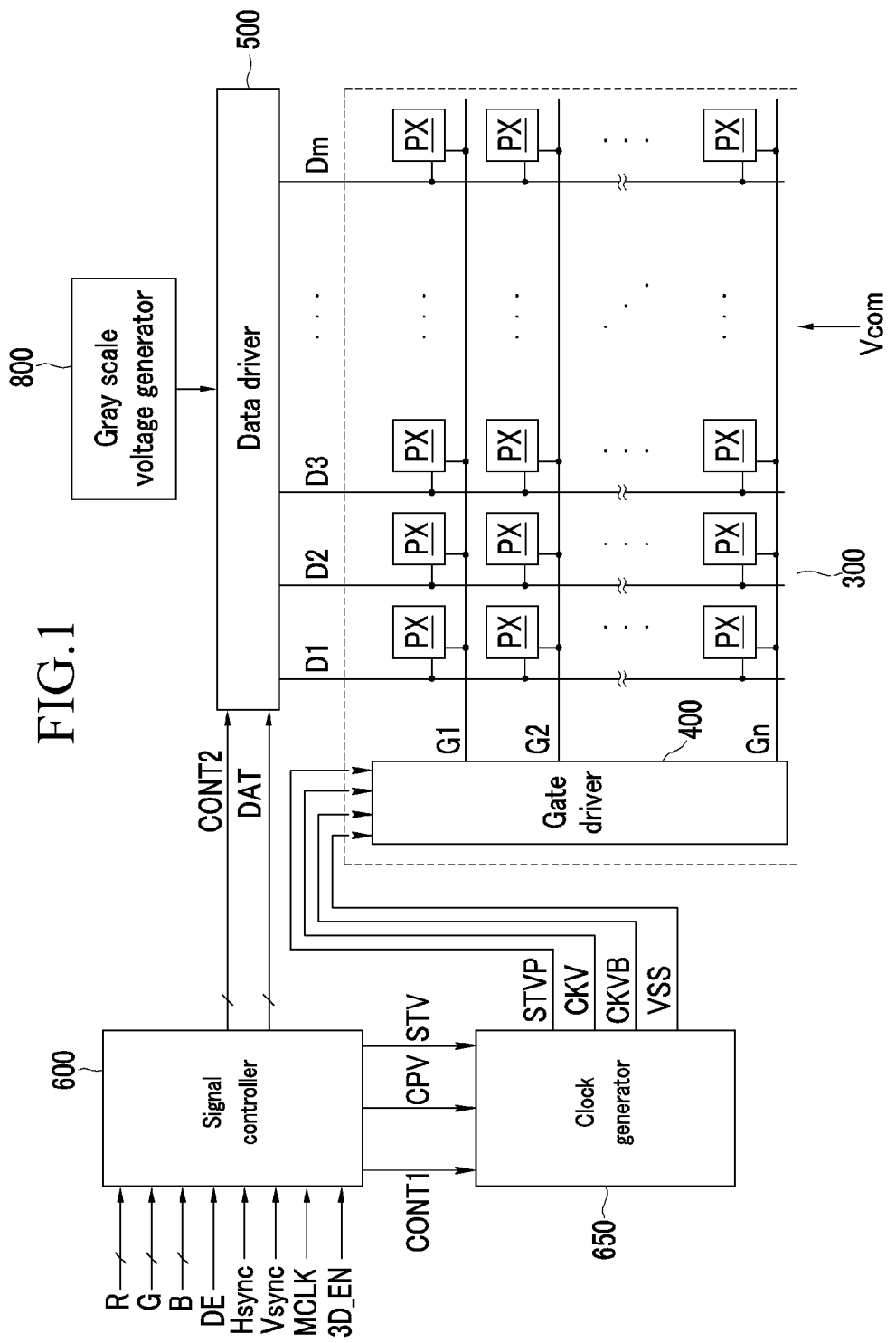
FIG. 1 is a block diagram illustrating an exemplary embodiment of a three dimensional ("3D") image display according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Now, an exemplary embodiment of a three-dimensional ("3D") image display according to the present invention will be described in detail with reference to FIGS. 1 to 3.

Figure 2:
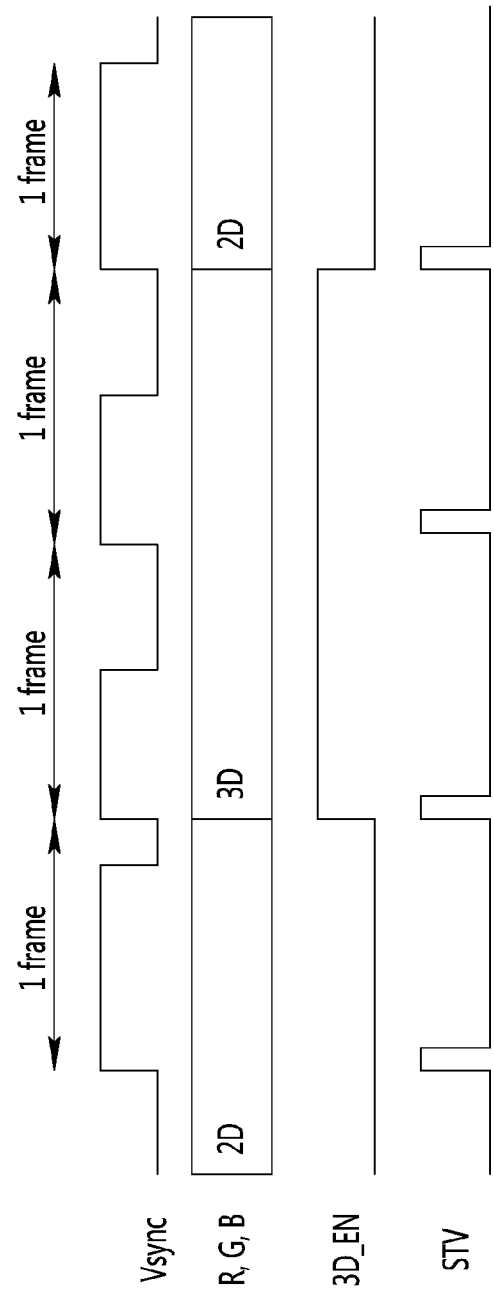
FIG. 2 is a signal timing diagram illustrating waveforms of signals used in the exemplary embodiment of a 3D image display according to the present invention.
Figure 3:
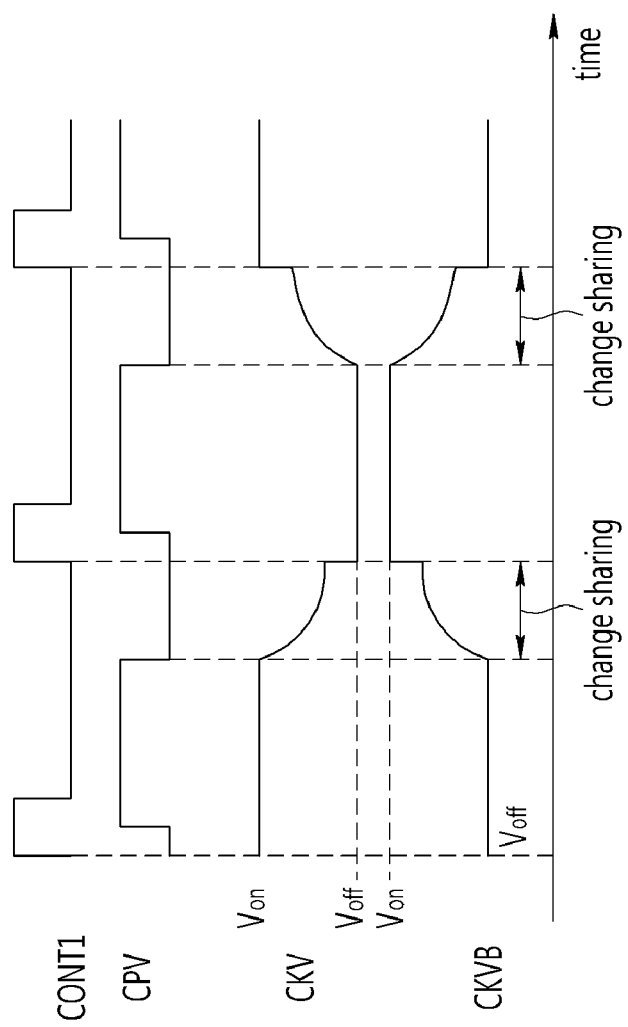
FIG. 3 is a signal timing diagram illustrating waveforms of signals used in the 3D image display.

FIG. 1 is a block diagram illustrating an exemplary embodiment of a 3D image display according to the present invention, FIG. 2 is a signal timing diagram illustrating waveforms of signals of an exemplary embodiment of the 3D image display according to the present invention, and FIG. 3 is a signal timing diagram illustrating waveforms of signals of an exemplary embodiment of the 3D image display according to the present invention.

As shown in FIG. 1, an exemplary embodiment of the 3D image display according to the present invention may include a display panel assembly 300, a gate driver 400 and a data driver 500 connected to the display panel assembly 300, a gray scale voltage generator 800 connected to the data driver 500, and a signal controller 600 which controls the gate driver 400 and the data driver 500.

The display panel assembly 300 may be a liquid crystal panel assembly, an organic light emitting panel assembly, a plasma display panel assembly, for example, and various other kinds of displays may be applied. Hereinafter, exemplary embodiments of the display panel assembly 300 including a liquid crystal panel assembly will be described, but the display panel assembly 300 is not limited thereto.

In an exemplary embodiment, a 3D image display may include a shutter member. In an exemplary embodiment, the shutter member may be a glasses type of shutter glasses, but not being limited thereto. In an alternative exemplary embodiment, the shutter member may include mechanical shutter glasses (goggles), optical shutter glasses, for example. Shutter glasses are configured such that a right eye shutter and a left eye shutter alternately block out light incident thereto at predetermined intervals in sync with a display screen. The right eye shutter may be in a closed state or in an opened state, and the left eye shutter may be in an opened state or in a closed state. More particularly, the left eye shutter may be in the closed state while the right eye shutter is in the opened state, the right eye shutter may be in the closed state while the left eye shutter is in the opened state, or both of the left eye shutter and the right eye shutter may be in the opened state or in the closed state.

Shutters for shutter glasses may be fabricated by employing a technique used for display devices, such as a liquid crystal display, an organic light emitting display and an electrophoretic display, for example, but not being limited thereto. In an exemplary embodiment, a shutter may include two transparent conductive layers and a liquid crystal layer interposed therebetween. The shutter may include polarization films disposed on surfaces of the conductive layers. A liquid crystal material rotates by a voltage applied to the shutter, and the rotation may allow the shutter to be in an opened state or a closed state.

In an exemplary embodiment, when a left eye image is output on the display, the left eye shutter of the shutter glasses may become the opened state to transmit light, and the right eye shutter may become the closed state to block out light. Further, when a right eye image is output on the display, the right eye shutter of the shutter glasses may become the opened state to transmit light, and the left eye shutter may become the closed state to block out light. When the left eye image is output on the display for a predetermined time period, and the right eye image is output on the display for a next time period after the predetermined time period, a left eye image is perceived by a left eye during the predetermined time period, and a right eye image is perceived by a right eye during the next time period. Accordingly, a 3D image having depth perception is perceived by the difference between the left eye image and the right eye image.

A gate-on signal may be sequentially applied from an upper gate line of a display to a lower gate line. In an exemplary embodiment, a display may display a left eye image as follows. A gate-on voltage may be sequentially applied to a gate lines to apply a data voltage to pixel electrodes through thin film transistors connected to the corresponding gate lines. In an exemplary embodiment, the applied data voltage is a data voltage (hereinafter, referred to as a "left eye data voltage") to express a left eye image, and the applied left eye data voltage may be maintained by a storage capacitance capacitor during a predetermined time period. Also, a data voltage (hereinafter, referred to as a "right eye data voltage") to express a right eye image may be applied in the similar way, and may be maintained by the storage capacitance capacitor during a time period next to the predetermined time period.

As shown in FIG. 1, the display panel assembly 300 may include a plurality of signal lines, e.g., first to n-th gate lines G1 to Gn and first to m-th data lines D1 to Dm, and a plurality of pixels PX that are connected to the plurality of signal lines and arranged substantially in the form of a matrix.

The signal lines may include a plurality of gate lines, e.g. the first to n-th gate lines G1 to Gn, which transmits gate signals and a plurality of data lines, e.g., the first to m-th gate line D1 to Dm, which transmits data signals.

In an exemplary embodiment, each pixel PX, e.g., a pixel connected to an i-th (i=1, 2, . . . , n) gate line Gi and a j-th (j=1, 2, . . . , m) data line Dj, may include a switching element connected to the signal lines, e.g., the -th gate line Gi and the j-th data line Dj, and a liquid crystal capacitor connected to the signal lines. In an alternative exemplary embodiment, each pixel PX may further include a storage capacitor. In an exemplary embodiment, each pixel PX may include a plurality of subpixels. The switching element may be a three-terminal element. In the switching element, a control terminal is connected to a gate line, e.g., the i-th gate line Gi, an input terminal is connected to a data line, e.g., the j-th data line Dj, and an output terminal is connected to the liquid crystal capacitor and the storage capacitor. The connection relationship between the pixels PX, the signal lines, e.g., the i-th gate line Gi and the j-th data line Dj, and the switching elements is not limited to the connection relationship shown in FIG. 1 but may be variously modified according to various methods, such as a method in which two pixels share one gate line and a method in which two pixels share one data line, for example.

The liquid crystal capacitor has a pixel electrode (not shown) and a common electrode (not shown) as two terminals, and a liquid crystal layer (not shown) functions as a dielectric material.

In an exemplary embodiment, the storage capacitor which assists the liquid crystal capacitor may be formed by overlapping an additional signal line (not shown) separate from a gate line and a data line and a pixel electrode with an insulator interposed therebetween, and a set voltage such as a common voltage Vcom is applied to the additional signal line. In an alternative exemplary embodiment, the storage capacitor of pixel may be formed by overlapping the pixel electrode and a gate line of an adjacent pixel disposed above the pixel with an insulator interposed therebetween.

In an exemplary embodiment, to implement color display, each pixel PX uniquely displays one of primary colors (spatial division) or alternately displays primary colors during each time frame (temporal division) such that a desired color is perceived as a spatial and/or temporal sum of the primary colors. The primary colors may be three primary colors such as red, green and blue, for example.

The signal controller 600 receives input image signals R, G and B and input control signals which control display of an input image, e.g., a vertical synchronization signal Vsync, a horizontal synchronization signal Hsync, a main clock MCLK, a data enable signal DE and a 3D enable signal 3D_EN, from an external graphic controller (not shown).

The input image signals R, G and B may be a 3D image or a two-dimensional ("2D") image. Here, the term '3D image' refers to source data which allows an observer to perceive 3D effects of images output on the display, and may be, for example, a left eye image, a right eye image, etc. The term '2D image' refers to source data which does not allow an observer to perceive 3D effect of images output on the display.

The signal controller 600 may provide a data control signal CONT2 and image data DAT obtained by processing image signals R, G and B based on an input control signal and the input image signals R, G and B to conform with operational conditions of the display panel assembly 300 to the data driver 500. Here, the process of the image signals R, G and B may include rearranging the image signals R, G and B according to a pixel arrangement of the display panel assembly 300.

Further, the signal controller 600 may provide a first scan start signal STV which indicates a beginning of scan, at least one clock control signal CPV which controls an output time of a gate-on voltage Von, and a clock enable signal CONT1 which determines a duration of the gate-on voltage Von being transmitted to a clock generator 650. The clock enable signal CONT1 may include more than one signal according to the frequency of the clock used for the 3D image display. In an exemplary embodiment, in the 3D image display, a clock frequency of about 175 hertz (Hz) may be used to output 3D mode images, and a clock frequency of about 120 Hz may be used to output a video in a 2D mode, and a clock frequency of about 60 Hz may be used to output a picture in the 2D mode. Accordingly, separate clock enable signals, e.g., a clock enable signal for the clock frequency of about 175 Hz CONT1_175, a clock enable signal for the clock frequency of about 120 Hz CONT1_120 and a clock enable signal for the clock frequency of about 60 Hz CONT1_60, may be generated based on clock frequencies to be used.

The clock generator 650 may generate clock signals, e.g., a first clock signal CKV and a second clock signal CKVB, based on the clock enable signal CONT1, the clock control signal CPV and the first scan start signal STV, etc., and provide the clock signals to the gate driver 400. Further, the clock generator 650 may transmit a second scan start signal STVP and a low-voltage signal VSS to the gate driver 400.

The data control signal CONT2 may include a horizontal synchronization start signal which indicates beginning of data transmission to a group of pixels, a load signal which signals to apply a corresponding data voltage to the data lines, e.g., the first to the m-th data lines D1 to Dm, and a data clock signal. The data control signal CONT2 may further include an inversion signal which inverts the polarity of a data voltage with respect to the common voltage Vcom (hereinafter, referred to as a "polarity of a data voltage").

The data driver 500 may receive a set of image data DAT on pixels of one row and select a gray scale voltage corresponding to each image data DAT from among gray scale voltages from a gray scale voltage generator 800 based on the data control signal CONT2. That is, the data driver 500 may convert the image data DAT into a corresponding voltage and apply the converted image data to a corresponding data line (D1-Dm).

The gate driver 400 sequentially applies the gate-on voltage Von to each gate line (G1-Gn) using the signal controller 600, and turns on switching elements connected to a corresponding gate line (G1-Gn) that receives the gate-on voltage Von. Accordingly, a data voltage applied to a corresponding data line (D1-Dm) corresponding to the corresponding gate line (G1-Gn) is applied to a pixel corresponding to the corresponding gate line (G1-Gn) and the corresponding data line (D1-Dm) through the switching elements turned on.

The difference between the data voltage applied to the pixel and the common voltage Vcom is referred to as a "pixel voltage." In a liquid crystal display, liquid crystal molecules have an orientation varies according to the magnitude of the pixel voltage, and polarization of light penetrating the liquid crystal layer varies according to the variation of the orientation of the liquid crystal molecules. Such variation of the polarization appears as a variation in transmittance of light due to a polarizer of the display panel.

In an exemplary embodiment, each of the drivers of the 3D image display, e.g., the gate driver 400, the data driver 500, the signal controller 600 and the gray scale voltage generator 800, may be formed as at least one Integrated Circuit ("IC") chip and directly mounted on the liquid crystal panel assembly 300, or be mounted on a flexible printed circuit film (not shown) and then attached to the liquid crystal panel assembly 300, or be formed as a tape carrier package ("TCP") and mounted on a separate printed circuit board ("PCB") (not shown). In an alternative exemplary embodiment, the drivers of the 3D image display, e.g., the gate driver 400, the data driver 500, the signal controller 600 and the gray scale voltage generator 800, may be integrated on the liquid crystal panel assembly 300 together with other elements, such as, the signal lines and thin film transistor switching elements, for example. In another alternative exemplary embodiment, the drivers of the 3D image display, e.g., the gate driver 400, the data driver 500, the signal controller 600 and the gray scale voltage generator 800, may be integrated as a single chip, and in this case, at least one of the drivers or at least one circuit element constituting the drivers may be disposed outside of the single chip.

Referring now to FIG. 2, a low-level section of the vertical synchronization signal Vsync depends on whether the input image data R, G and B correspond to a 3D image or a 2D image. In an exemplary embodiment, the low-level section of the vertical synchronization signal Vsync is the longer when the input image data R, G and B correspond to a 3D image, and the low-level section of the vertical synchronization signal Vsync is the shorter when the input image data R, G and B correspond to a 2D image. Here, the low-level section of the vertical synchronization signal Vsync is also referred to as a "vertical blank time." A frequency of a clock signal corresponding to a 3D image may be greater than a frequency of a clock signal corresponding to a 2D image. In an exemplary embodiment, the frequency of the clock signal corresponding to a 2D image may be about 60 Hz or about 120 Hz, for example. Since a vertical blank time of a 3D image is greater than that of a 2D image by about 30%, a frequency of a clock signal corresponding to a 3D image may be about 175 Hz. As the frequency of the clock signal becomes lower, a high-level section of the clock signal may become longer. The first scan start signal STV may inform the 3D image display of beginning of each time frame. The 3D enable signal 3D_EN may be maintained at a high level while 3D input images are input, and thereby inform the 3D image display that the 3D images are input.

Referring now to FIG. 3, the clock signals, e.g., the first clock signal CKV and the second clock signal CKVB, may be generated based on the clock enable signal CONT1 and the clock control signal CPV. In an exemplary embodiment, the frequency of the clock may be about 175 Hz, about 120 Hz, or about 60 Hz, and the clock enable signal CONT1 may have various frequencies according to the frequency of the clock (e.g., the clock enable signal for the clock frequency of about 175 Hz CONT1__175, the clock enable signal for the clock frequency of about 120 Hz CONT1__120 and the clock enable signal for the clock frequency of about 60 Hz CONT1__60). In an alternative exemplary embodiment, the frequencies of the clock enable signals CONT1 may be identical regardless of the frequencies of the clock signals. In an exemplary embodiment, the clock control signal CPV may be subdivided according to the frequencies of the clock signals. In an exemplary embodiment, as the frequencies of the clock signals become lower, the frequency of the clock control signal CPV may become lower.

During a period from a rising edge of the clock enable signal CONT1 to a falling edge of the clock control signal CPV, the clock signals, e.g., the first clock signal CKV and the second clock signal CKVB, may be maintained at a high level voltage Von or a low level voltage Voff. In an exemplary embodiment, the first clock signal CKV and the second clock signal CKVB may have different phases opposite to each other. As shown in FIG. 3, the first clock signal CKV may have the high level voltage Von and the second clock signal CKVB may be maintained at the low level voltage Voff. When the clock control signal CPV has a falling edge, the first clock signal CKV starts discharging and the second clock signal CKVB starts charging. In an exemplary embodiment, while electric charge is shared, the first clock signal CKV transits to the low level voltage Voff due to the discharging and the second clock signal CKVB transits to the high level voltage Von. When the clock enable signal CONT1 has a rising edge, the first clock signal CKV has the low level voltage Voff, and the second clock signal CKVB has the high level voltage Von. As shown in FIG. 3, until the clock control signal CPV has a falling edge, the first clock signal CKV may be maintained at the low level voltage Voff and the second clock signal CKVB may be maintained at the high level voltage Von. When the clock control signal CPV has a falling edge, the second clock signal CKVB starts discharging and the first clock signal CKV starts charging. In an exemplary embodiment, while electric charge is shared, the second clock signal CKVB transits to the low level voltage Voff due to the discharging and the first clock signal CKV transits to the high level voltage Von.

Figure 4:
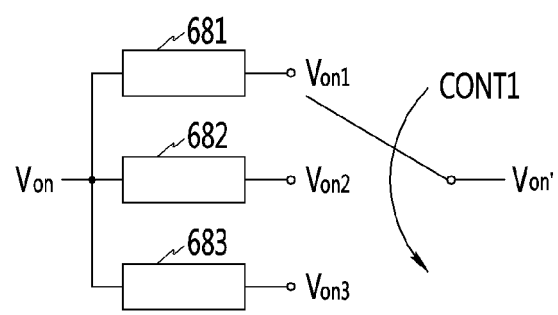
FIG. 4 is a block diagram of an exemplary embodiment of voltage generators of the 3D image display illustrating gate-on voltage transformation.
Figure 5:
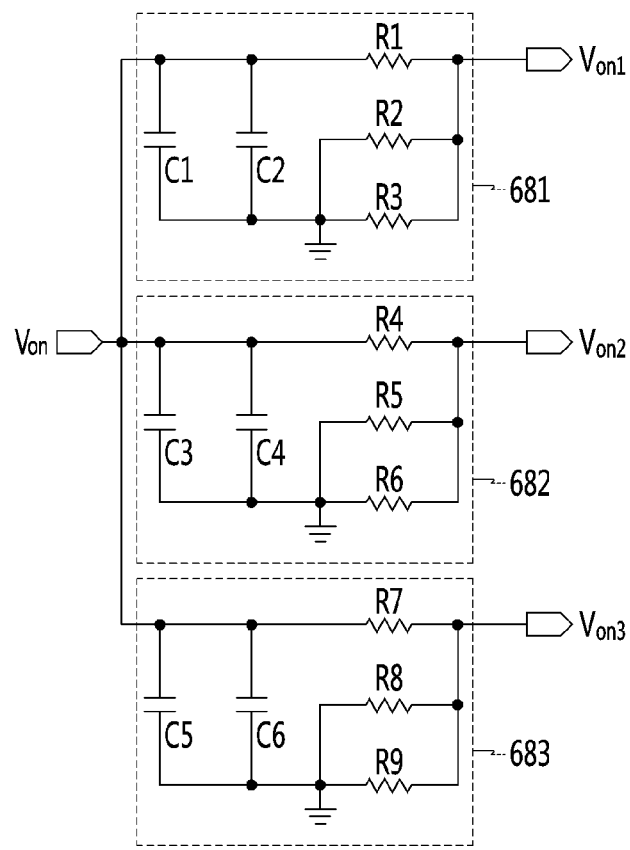
FIG. 5 is a schematic circuit diagram of an exemplary embodiment of the voltage generators of FIG. 4.
Figure 6:
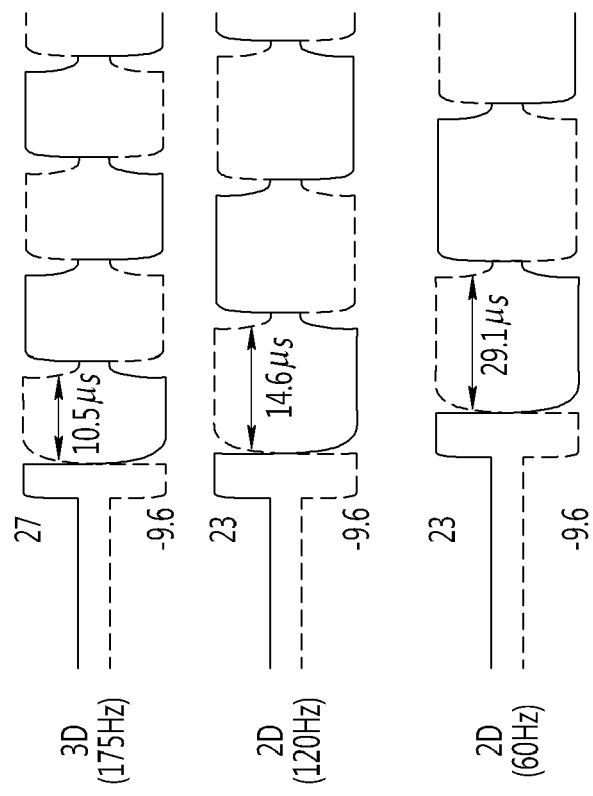
FIG. 6 is a signal timing diagram illustrating waveforms of clock signals of the 3D image display according to the present invention.

FIG. 4 is a block diagram of an exemplary embodiment of voltage generators illustrating gate-on voltage transformation according he present invention, FIG. 5 is a schematic circuit diagram of an exemplary embodiment of voltage generators of FIG. 4, and FIG. 6 is a signal timing diagram illustrating waveforms of clock signals of an exemplary embodiment of the 3D image display according to the present invention.

Referring to FIG. 4, a clock-signal high-level value Von may be converted into a first clock-signal high-level value Von1, a second clock-signal high-level value Von2, and a third clock-signal high-level value Von3 through voltage regulators 681, 682 and 683. In an exemplary embodiment, the voltage regulators 681, 682 and 683 may be included in the clock generator 650. In an alternative exemplary embodiment, the voltage regulators 681, 682 and 683 may be separated from the clock generator 650. In an exemplary embodiment, the high level voltage Von of the clock signals may be the same as the high level voltage Von of the clock signals, e.g. the first clock signal CKV and the second clock signal CKVB, of FIG. 3. In an alternative exemplary embodiment, all of the first clock-signal high-level value Von1, the second clock-signal high-level value Von2 and the third clock-signal high-level value Von3 may have different values, or any two of the first clock-signal high-level value Von1, the second clock-signal high-level value Von2, and the third clock-signal high-level value Von3 may have the same value and the other one may have a different value. Based on the clock enable signal CONT1, any one of the first clock-signal high-level value Von1, the second clock-signal high-level value Von2, and the third clock-signal high-level value Von3 may be selected as a correction clock-signal high-level value Von'. Based on the correction clock-signal high-level value Von', the gate driver 400 may supply the gate-on voltage to the gate lines, e.g., the first gate line G1 to the n-th gate line Gn. In an exemplary embodiment, when the input image signals R, G and B correspond to a 3D image, the signal controller 600 may set a clock frequency to about 175 Hz and outputs only the clock enable signal for the clock frequency of about 175 Hz of the clock enable signals CONT1 at a high level, and the first clock-signal high-level value Von1 may be thereby selected as the correction clock-signal high-level value Von'. In an exemplary embodiment, when the input image signals R, G and B correspond to a 2D video (2D moving image), the signal controller 600 may set a clock frequency to about 120 Hz and outputs only the clock enable signal for the clock frequency of about 120 Hz CONT1__120 of the clock enable signals CONT1 at a high level, and the second clock-signal high-level value Von2 may be thereby selected as the correction clock-signal high-level value Von'. In an exemplary embodiment, when the input image signals R, G and B correspond to a 2D picture (2D still image), the signal controller 600 may set a clock frequency to about 60 Hz and outputs only the clock enable signal for the clock frequency of about CONT1_60 of the clock enable signals CONT1 at a high level, and the third clock-signal high-level value Von3 may be thereby selected as the correction clock-signal high-level value Von'. However, the correction clock-signal high-level value Von' is not limited thereto. In an alternative exemplary embodiment, the correction clock-signal high-level value Von' may be selected from two or four clock-signal high-level values, for example.

Referring now to FIG. 5, an exemplary embodiment of circuit diagrams of the voltage regulators 681, 682 and 683 may include three resistors and two capacitors. In an exemplary embodiment, all of capacitors, e.g., a first capacitor C1 to a sixth capacitor C6, may have 1000 nanoFarad (nF), a first resistor R1 may have about 220 kilo-ohm (Kohm), a second resistor R2 may have 15 Kohm, a third resistor R3 may have about 33 Kohm, a fourth resistor R4 may have about 220 Kohm, a fifth resistor R5 may have about 39 Kohm, a sixth resistor R6 may have about 18 Kohm, a seventh resistor R7 may have about 220 Kohm, an eighth resistor R8 may have about 39 Kohm, and a ninth resistor R9 may have about 18 Kohm. In an alternative exemplary embodiment, the seventh resistor R7 may have about 220 Kohm, the eighth resistor R8 may have about 30 Kohm, the ninth resistor R9 may have about 30 Kohm, and the electrical resistances of the other resistors, e.g., the first resistor R1, the second resistor R2, the third resistor R3, the fourth resistor R4, the fifth resistor R5 and the sixth resistor R6, may be the same as the above. The voltage regulators 681, 682 and 683 are not limited to the circuit diagram shown in FIG. 5, but the voltage regulators 681, 682 and 683 may be configured by using various forms of circuit elements.

Referring now to FIG. 6, in an exemplary embodiment, when a 3D image is input, the frequency of the clock signal may be about 175 Hz and the amplitude thereof may be about 36.4 volt (V). When a 2D video is input, the frequency of the clock signal may be about 120 Hz and the amplitude thereof may be about 32.4 V. Similarly, when a 2D picture is input, the frequency of the clock signal may be about 60 Hz and the amplitude thereof may be about 32.4 V. Accordingly, where an amplitude of the clock signal corresponding to a 3D image becomes different from an amplitude of the clock signal corresponding to a 2D image, the heat and power consumption of the 3D image display is substantially reduced compared to a 3D image display where the amplitude of the clock signal is fixed to an amplitude of the clock signal corresponding to a 3D image since the power consumption increases as an amplitude of the clock signal increases, and the heat increases due to an increase in the size of transistors. In an exemplary embodiment, where an amplitude of a clock signal corresponding to a 2D video becomes different from an amplitude of a clock signal corresponding to a 2D picture, the heat and power consumption of the 3D image display is substantially reduced compared to a 3D image display where the amplitude of the clock signal is fixed to a clock amplitude corresponding to a 2D video. According to experiments, assuming that electric charge is not shared, the power consumption of the gate driver which drives a 2D video (120 Hz) may be reduced from about 0.934 watt (W) to about 0.749 watt (W) by about 20%, and the power consumption of the gate driver which drives a 2D picture (60 Hz) may be reduced from about 0.467 W to about 0.288 W by about 39%. As shown in FIG. 6, duration times of high levels or low levels of clock signals are 10.5 microseconds (μs), 14.6 microseconds (μs), and 29.1 microseconds (μs), respectively. However, values of clock frequencies, clock amplitudes and duration times are not limited to the values shown in FIG. 6. In an alternative exemplary embodiment, the values of clock frequencies, clock amplitudes and duration times may have various values.

Figure 7:
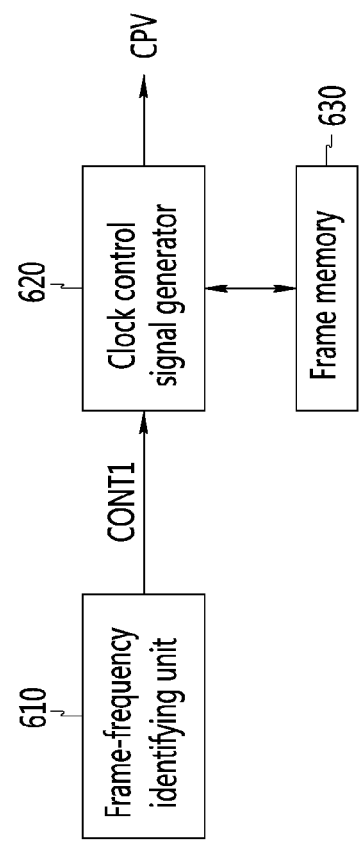
FIG. 7 is a block diagram of an exemplary embodiment of the signal controller of the 3D image display illustrating generation of a clock control signal.
Figure 8:
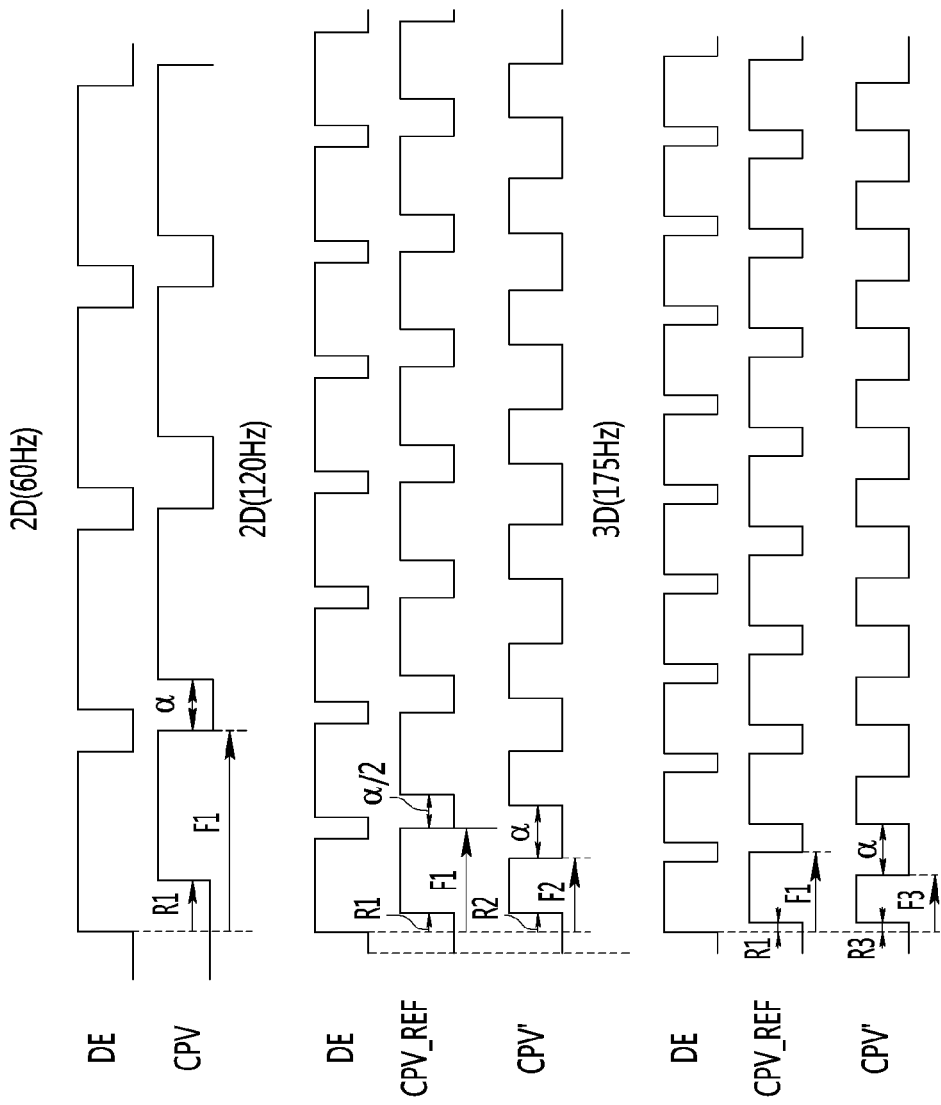
FIG. 8 is a signal timing diagram illustrating waveforms of signals used in the 3D image display.

FIG. 7 is a block diagram of an exemplary embodiment of the signal controller illustrating generation of a clock control signal, and FIG. 8 is a signal timing diagram illustrating waveforms of signals of an exemplary embodiment of the 3D image display according to the present invention.

Referring to FIGS. 7 and 8, a frame-frequency identifying unit 610 identifies a frequency of a clock signal and transmits the clock enable signal CONT1 to a clock control signal generator 620. In an exemplary embodiment, when the frequency of the clock signal is about 175 Hz, only one clock enable signal, e.g., the clock enable signal for the clock frequency of about 175 Hz CONT1_175, has a high level. When the frequency of the clock signal is about 120 Hz, only one clock enable signal, e.g., the clock enable signal for the clock frequency of about 120 Hz CONT1_120, has a high level. When the frequency of the clock signal is about 60 Hz, only one clock enable signal, the clock enable signal for the clock frequency of about 60 Hz CONT1_60, has a high level.

When the clock enable signal for the clock frequency of about 175 Hz CONT1_175 has the high level, a correction clock control signal CPV' may be generated based on a third rising time R3 and a third falling time F3 stored in a frame memory 630. Therefore, a length of a low level section of the correction clock control signal CPV' relating to an electric charge sharing time may be greater than a length of a low level section (about α/3) of a base clock control signal CPV_REF. As a length of a low level section of a clock control signal increases, the electric charge sharing time becomes longer and the power consumption of the 3D image display is substantially reduced. Accordingly, the power consumption of the 3D image display may be substantially reduced by the correction clock control signal CPV'.

Similarly, when the clock enable signal for the clock frequency of about 120 Hz CONT1_120 has the high level, the correction clock control signal CPV' may be generated based on a second rising time R2 and a second falling time F2 stored in the frame memory 630. Therefore, a length of a low level section a of the correction clock control signal CPV' relating to an electric charge sharing time may be greater than a length of a low level section (about α/2) of a base clock control signal CPV_REF. Accordingly, the power consumption of the 3D image display may be substantially reduced by the correction clock control signal CPV'.

When the clock enable signal for the clock frequency of about 60 Hz CONT1_60 has the high level, the clock control signal CPV may be generated based on a first rising time R1 and a first falling time F1 stored in the frame memory 630. In this case, a length of a low level section of the correction clock control signal CPV' relating to an electric charge sharing time may be α.

Therefore, even though the frequencies of the clock signals change, the electric charge sharing times for the individual clock signals may be substantially identical.

The relationship between the rising times, e.g., the first rising time R1, the second rising time R2 and the third rising time R3, and the falling times, e.g., the first falling time F1, the second falling time F2 and the third falling time F3, may satisfy the following Equation.

$$(F1/R1) > (F2/R2) > (F3/R3) \quad \quad \text{[Equation 1]}$$

Here, a ratio of the first rising time R1 and the first falling time F1 of the base clock control signal CPV_REF are identical with that of the clock control signal CPV. The first rising time R1, the second rising time R2 and the third rising time R3 are times from a rising edge of the data enable signal DE to rising edges of the clock control signal CPV, the base clock control signal CPV_REF and the correction clock control signal CPV', respectively. The first falling time F1, the second falling time F2 and the third falling time F3 are times from a rising edge of the data enable signal DE to falling edges of the clock control signal CPV, the base clock control signal CPV_REF and the correction clock control signal CPV', respectively.

In FIG. 8, the electric charge sharing time adjusts the relationship between the rising times, e.g., the first rising time R1, the second rising time R2 and the third rising time R3, and the falling times, e.g., the first falling time F1, the second falling time F2 and the third falling time F3, such that the clock control signals, e.g., the clock control signal CPV, the base clock control signal CPV_REF and the correction clock control signal CPV', have the identical low level time in reference to 60 Hz; however, the electric charge sharing time is not limited thereto. In an exemplary embodiment, the relationship between the rising times, e.g., the first rising time R1, the second rising time R2 and the third rising time R3, and the falling times, e.g., the first falling time F1, the second falling time F2 and the third falling time F3, may be adjusted such that the clock control signals have the identical low level time in accordance with 120 Hz or 175 Hz.

According to experiments, assuming that the electric charge sharing time is fixed, the power consumption of the gate driver which drives a 3D image (175 Hz) may be reduced from about 0.75 W to about 0.56 W by about 25%, and the power consumption of the gate driver which drives a 2D video (120 Hz) may be reduced from about 0.60 W to about 0.51 W by about 15%.

Figure 9:
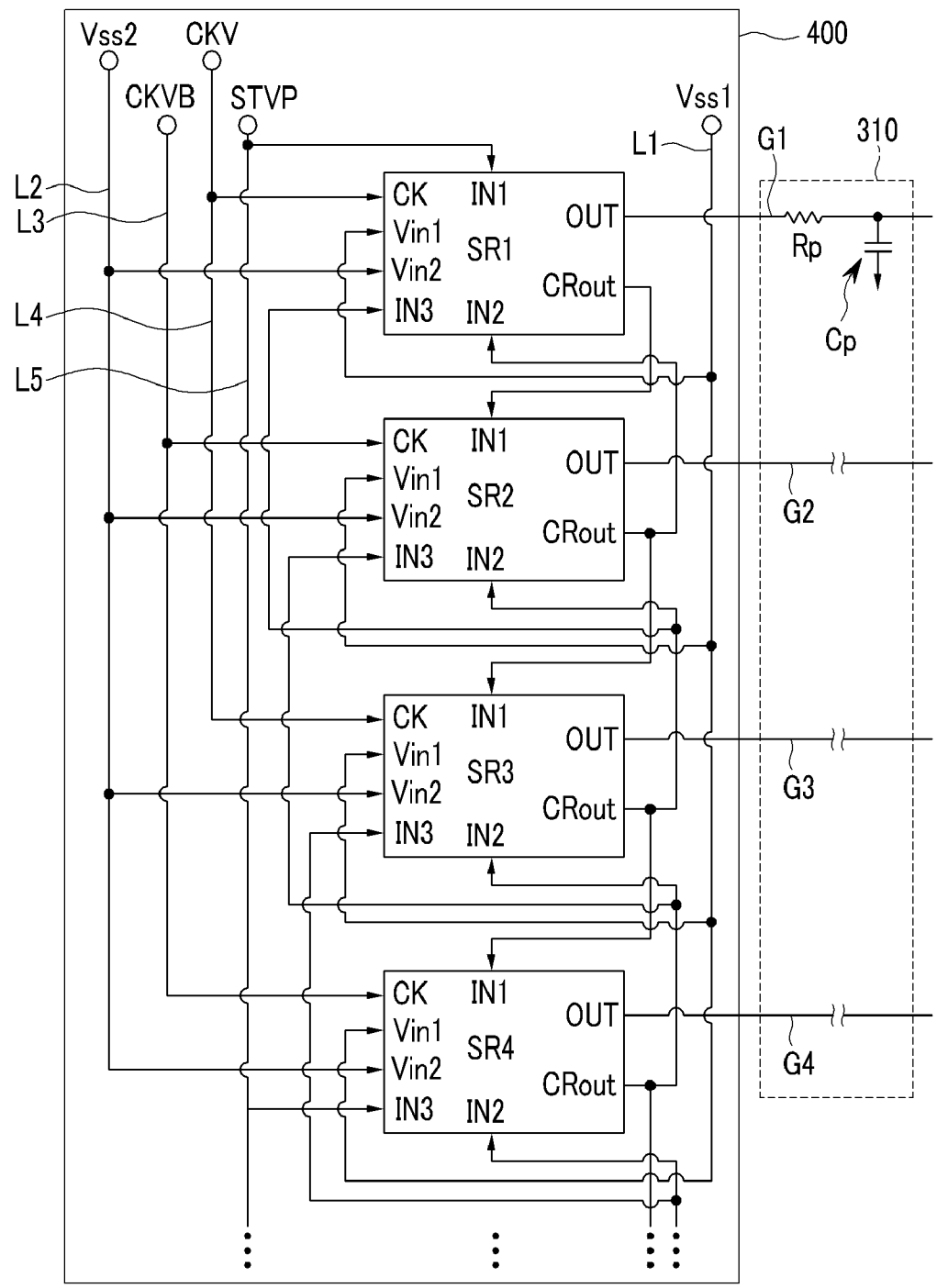
FIG. 9 is a schematic circuit diagram of an exemplary embodiment of a gate driver of the 3D image display.
Figure 10:
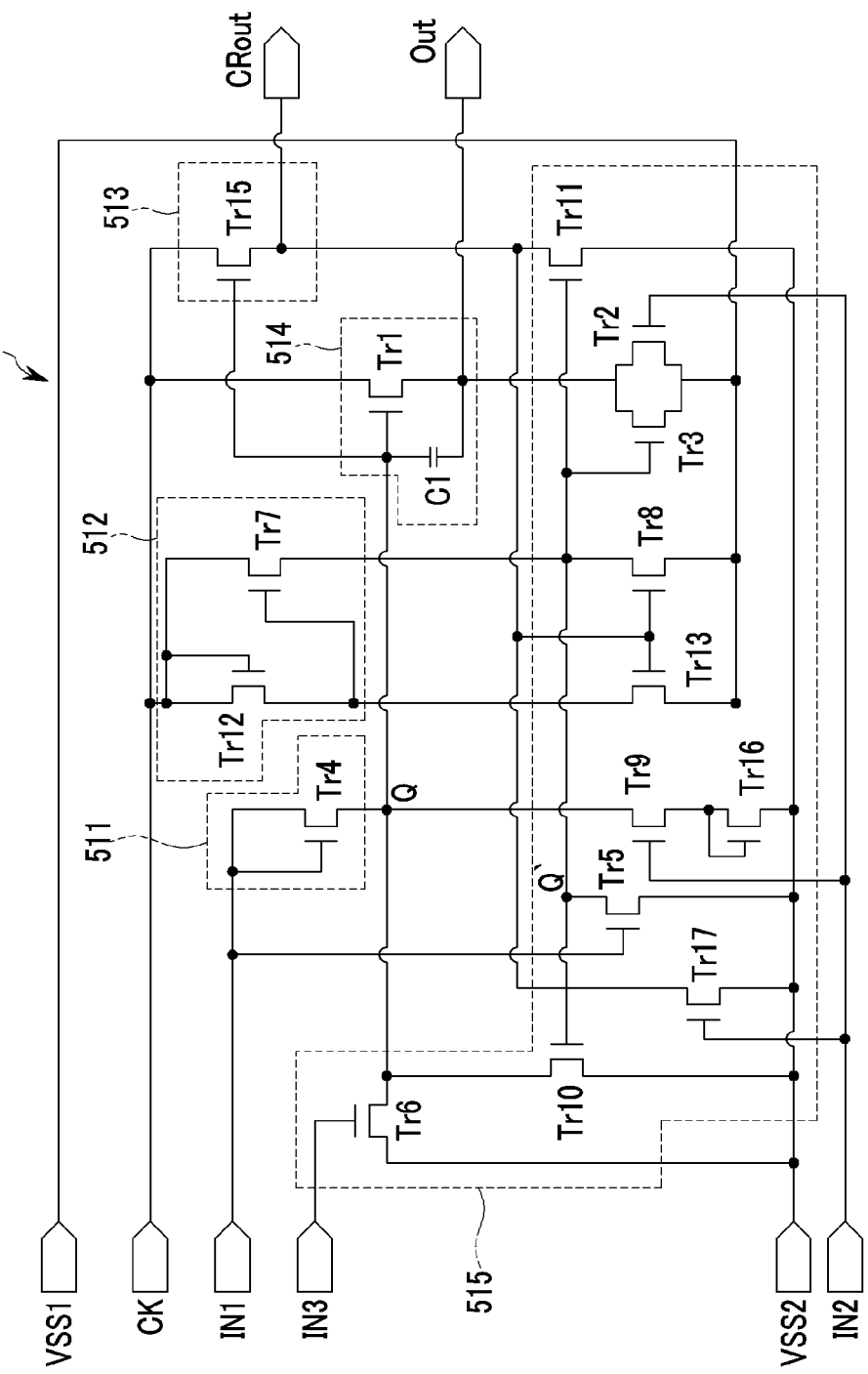
FIG. 10 is a schematic circuit diagram of an exemplary embodiment of a stage of the gate driver of FIG. 9.

FIG. 9 is a schematic circuit diagram of an exemplary embodiment of a gate driver of the 3D image display, and FIG. 10 is a schematic circuit diagram of an exemplary embodiment of a stage of the gate driver of FIG. 9.

Referring to FIG. 9, signals provided from the signal controller 600 include signals such as the clock signals, e.g., the first clock signal CKV and the second clock signal CKVB, and a scan start signal STVP and signals which provide low voltages, e.g. a first low voltage Vss1 and a second low voltage Vss2, having specific levels.

The gate driver 400 receives the clock signals, e.g., the first clock signal CKV and the second clock signal CKVB, the scan start signal STVP, the first low voltage Vss1 corresponding to a gate-off voltage, and the second low voltage Vss2 lower than the gate-off voltage, and the gate driver 400 generates gate voltages (the gate-on voltage and the gate-off voltage) and sequentially applies the gate-on voltage to the gate lines G1 to Gn.

The first low voltage Vss1, the second low voltage Vss2, the clock signals, e.g., the first clock signal CKV and the second clock signal CKVB, and the scan start signal STVP applied to the gate driver 400 are transmitted through a first voltage signal line L1, a second voltage signal line L2, clock signal lines L3 and L4, and a scan start signal line L5, respectively.

Referring again to FIG. 9, a display area 310 is represented using a resistor Rp and a capacitor Cp. The resistor Rp and the capacitor Cp represent a single resistor and a single capacitor having resistance and capacitance substantially equal to the total sums of resistances and capacitances of the gate lines G1 to Gn, liquid crystal capacitors Clc and storage capacitors Cst, respectively. A gate voltage output from a stage SR is transmitted through a gate line. The gate lines G1 to Gn may be considered to have the resistance of the resistor Rp and the capacitance of the capacitor Cp in a circuit. One gate line (G1-Gn) may have the resistance of the resistor Rp and the capacitance of the capacitor Cp as a whole, or may have various resistances and capacitances according to the configuration and characteristics of the display area 300.

The gate driver 400 includes a plurality of stages (a first stage SR1, a second stage SR2, a third stage SR3 a fourth stage SR4 . . . a n-th stage SRn) connected to each other in a cascade arrangement. Each stage (SR1, SR2, SR3, SR4 . . . SRn) includes three input terminals, e.g., a first input terminal IN1, a second input terminal IN2 and a third input terminal IN3, one clock input terminal CK, two voltage input terminals, e.g., a first voltage input terminal Vin1 and a second voltage input terminal Vin2, a gate voltage output terminal OUT which outputs a gate voltage and a transmission signal output terminal CRout.

The first input terminal IN1 is connected to the transmission signal output terminal CRout of the previous stage to receive a transmission signal CR of the previous stage. Since there is no stage before the first stage, the first stage receives the scan start signal STVP through the first input terminal IN1.

The second input terminal IN2 is connected to a transmission signal output terminal CRout of the next stage to receive a transmission signal CR of the next stage. Further, the third input terminal IN3 is connected to a transmission signal output terminal CRout of the stage after next to receive a transmission signal CR of the stage after next.

The n-th stage SRn (not shown) connected to an n-th gate line Gn may include two dummy stages which receive transmission signals CR from the next stage SRn+1 thereof and the stage after the next stage SRn+2. The dummy stages SRn+1 and SRn+2 (not shown) are stages that generate dummy gate voltages differently from the other stages, e.g., the first stage SR1 to the n-th stage SRn, and output them. That is, gate voltages output from the other stages, e.g., the first stage SR1 to the n-th stage SRn, are transferred through the gate lines such that data voltages are applied to pixels to display an image. In contrast, the dummy stages SRn+1 and SRn+2 may not be connected to the gate lines. Even though the dummy stages SRn+1 and SRn+2 are connected to the gate lines, the dummy stages SRn+1 and SRn+2 may be connected to the gate lines of dummy pixels (not shown) that do not display an image and thus may not be used for displaying an image.

A clock signal, e.g., one of the first clock signal CKV and the second clock signal CKVB, is applied to a clock terminal CK. The first clock signal CKV is applied to clock terminals CK of odd-numbered stages of the plurality of stages and the clock signal CKVB is applied to clock terminals CK of even-numbered stages. The two clock signals, e.g., the first clock signal CKV and the second clock signal CKVB, may be signals having different phases.

The first low voltage Vss1 corresponding to the gate-off voltage is applied to the first voltage input terminal Vin1, and the second low voltage Vss2 lower than the first low voltage Vss1 is applied to the second voltage input terminal Vin2. The voltage of the first low voltage Vss1 and the second low voltage Vss2 may vary.

In an exemplary embodiment, the first stage SR1 receives the first clock signal CKV, provided from the outside, through the clock input terminal CK thereof, the scan start signal STVP through the first input terminal IN1, the first and second low voltages Vss1 and Vss2 through the first and second voltage input terminals Vin1 and Vin2, and transmission signals CR provided from the second stage SR2 and the third stage SR3 through the second and third input terminals IN2 and IN3, and outputs a gate-on voltage to a first gate line G1 through the gate voltage output terminal OUT. Further, the first stage outputs a transmission signal CR to the first input terminal IN1 of the second stage SR2 through the transmission signal output terminal CRout.

The second stage SR2 receives the second clock signal CKVB, provided from the outside, through the clock input terminal CK, the transmission signal CR of the first stage SR1 through the first input terminal IN1, the first and second low voltages Vss1 and Vss2 through the first and second voltage input terminals Vin1 and Vin2, and transmission signals CR, respectively provided from the third stage SR3 and the fourth stage SR4, through the second and third input terminals IN2 and IN3, and outputs a gate-on voltage to a second gate line through the gate voltage output terminal OUT. Further, the second stage outputs a transmission signal CR to the first input terminal IN1 of the third stage SR3 and the second input terminal IN2 of the first stage SR1 through the transmission signal output terminal CRout.

The third stage SR3 receives the first clock signal CKV, provided from the outside, through the clock input terminal CK, the transmission signal CR of the second stage SR2 through the first input terminal IN1, the first and second low voltages Vss1 and Vss2 through the first and second voltage input terminals Vin1 and Vin2, and transmission signals CR, respectively provided from the fourth stage SR4 and the fifth stage SR5, through the second and third input terminals IN2 and IN3, and outputs a gate-on voltage to a third gate line through the gate voltage output terminal OUT. Further, the third stage outputs the transmission signal CR to the first input terminal IN1 of the fourth stage SR4, the third input terminal IN3 of the first stage SR1, and the second input terminal IN2 of the second stage through the transmission signal output terminal CRout.

Similarly as described above, the n-th stage SRn receives the clock signal, e.g., the first clock signal CKV or the second clock signal CKVB, provided from the external, through the clock input terminal CK, a transmission signal CR of an (n−1)-th stage SRn−1 through the first input terminal IN1, the first and second low voltages Vss1 and Vss2 through the first and second voltage input terminals Vin1 and Vin2, and transmission signals CR, respectively provided from an (n+1)-th stage SRn+1 (a dummy stage) and an (n+2)-th stage SRn+2 (a dummy stage), through the second and third input terminals IN2 and IN3, and outputs a gate-on voltage to an n-th gate line through the gate voltage output terminal OUT. Further, the n-th stage outputs a transmission signal CR to the first input terminal IN1 of the (n+1)-th stage SRn+1 (a dummy stage), the third input terminal IN3 of an (n−2)-th stage SRn−2, and the second input terminal IN2 of the (n−1)-th stage SRn−1 through the transmission signal output terminal CRout.

Referring now to FIG. 10, each stage SR of the gate driver 400 includes an input unit 511, a pull-up driver 512, a transmission signal generator 513, an output unit 514 and a pull-down driver 515.

The input unit 511 includes one transistor (e.g., a fourth transistor Tr4) and an input terminal and a control terminal of the fourth transistor Tr4 are connected in common to the first input terminal IN1 (diode connection), and an output terminal is connected to a first contact point Q. When a high voltage is applied to the first input terminal IN1, the input unit 511 transfers the high voltage to the first contact point Q.

The pull-up driver 512 includes two transistors (e.g., a seventh transistor Tr7 and a twelfth transistor Tr12. In an exemplary embodiment, a control terminal and an input terminal of the twelfth transistor Tr12 are connected in common to receive the clock signal, e.g., the first clock signal CKV or the second clock signal CKVB, through the clock terminal CK, and an output terminal thereof is connected to a control terminal of the seventh transistor Tr7 and the pull-down driver 515. In an exemplary embodiment, an input terminal of the seventh transistor Tr7 is connected to the clock terminal CK, an output terminal thereof is connected to a second contact point Q' (hereinafter, also referred to as a "second node") to be connected to the pull-down driver 515 through the second contact point Q'. The control terminal of the seventh transistor Tr7 is connected to the output terminal of the twelfth transistor Tr12 and the pull-down driver 515. Here, parasitic capacitors (not shown) may be disposed between the input terminal and the control terminal of the seventh transistor Tr7 and between the control terminal and the output terminal of the seventh transistor Tr7. In the pull-up driver 512, when a high-level signal is applied to the clock terminal CK, the high-level signal is transmitted to the control terminal of the seventh transistor Tr7 and the pull-down driver 515 through the twelfth transistor Tr12. The high-level signal transmitted to the seventh transistor Tr7 turns on the seventh transistor Tr7 such that the high-level signal applied to the clock terminal CK is applied to the second contact point Q'.

The transmission signal generator 513 includes one transistor (a fifteenth transistor Tr15. An input terminal of the fifteenth transistor Tr15 is connected to the clock terminal CK to receive the first clock signal CKV or the second clock signal CKVB, a control terminal thereof is connected to an output of the input unit 511, e.g., the contact point Q, and an output terminal thereof is connected to the transmission signal output terminal CRout and thereby outputs a transmission signal CR. Here, a parasitic capacitor (not shown) may be disposed between the control terminal and the output terminal. The output terminal of the fifteenth transistor Tr15 is connected to not only the transmission signal output terminal CRout but also the pull-down driver 515 to receive the second low voltage Vss2. Accordingly, when the transmission signal CR has a low level, a voltage value has the value of the second low voltage Vss2.

The output unit 514 includes one transistor (a first transistor Tr1) and one capacitor (a first capacitor C1). A control terminal of the first transistor Tr1 is connected to the contact point Q an input terminal thereof receives the first clock signal CKV or the second clock signal CKVB through the clock terminal CK, the first capacitor C1 is disposed between the control terminal and an output terminal of the first transistor Tr1, and the output terminal is connected to the gate voltage output terminal OUT. Further, the output terminal is connected to the pull-down driver 515 to receive the first low voltage Vss1. As a result, the voltage value of the gate-off voltage has the value of the first low voltage Vss1. The output unit 514 outputs a gate voltage according to the voltage on the contact point Q and the first clock signal CKV.

The pull-down driver 515 may lower the electric potential of the first contact point Q, may lower the electric potential of the second contact point Q', may lower a voltage output as a transmission signal CR, and may lower a voltage to be output to a gate line such that electric charge existing on the stage SR is removed, the gate-off voltage and the low voltage of the transmission signal CR are thereby substantially smoothly output. The pull-down driver 515 includes 11 transistors (a second transistor Tr2, a third transistor Tr3, a fifth transistor Tr5, a sixth transistor Tr6, an eighth transistor Tr8 to an eleventh transistor Tr11, a thirteenth transistor Tr13, a sixteenth transistor Tr16, and a seventeenth transistor Tr17).

Now, transistors for pulling down the contact point Q will be described. The transistors that pull down the first contact point Q are the sixth transistor Tr6, the ninth transistor Tr9, the tenth transistor Tr10 and the sixteenth transistor Tr16.

A control terminal of the sixth transistor Tr6 is connected to the third input terminal IN3, an output terminal thereof is connected to the second voltage input terminal Vin2 and an input terminal thereof is connected to the first contact point Q. Therefore, the sixth transistor Tr6 is turned on according to the transmission signal CR applied by the stage after the next stage to lower the voltage of the first contact point Q to the second low voltage Vss2.

The ninth transistor Tr9, together with the sixteenth transistor Tr16, pulls down the first contact point Q, a control terminal of the ninth transistor Tr9 is connected to the second input terminal IN2, an input terminal thereof is connected to the first contact point Q and an output terminal thereof is connected to an input terminal and a control terminal of the sixteenth transistor Tr16. The control terminal and the input terminal of the sixteenth transistor Tr16 are connected to the output terminal of the ninth transistor Tr9 (diode connection), and an output terminal thereof is connected to the second voltage input terminal Vin2. Therefore, the ninth transistor Tr9 and the sixteenth transistor Tr16 are turned on according to the transmission signal CR applied by the stage after the next stage to lower the voltage of the first contact point Q to the second low voltage Vss2.

An input terminal of the tenth transistor Tr10 is connected to the first contact point Q an output terminal thereof is connected to the second voltage input terminal Vin2, and a control terminal thereof is connected to the second contact point Q' (which is also referred to as an "inversion terminal" because it has a phase opposite to a phase of the voltage of the first contact point Q). Therefore, the tenth transistor Tr10 continuously lowers the second low voltage Vss2 of the first contact point Q during a general section in which the second contact point Q' has a high voltage and does not lower the voltage of the first contact point Q only when the voltage of the second contact point Q' is at a low level. When the voltage of the first contact point Q is not lowered, the corresponding stage outputs the gate-on voltage and the transmission signal CR.

Transistors that pull down the second contact point Q' in the pull-down driver 515 will now be described. The transistors that pull down the second contact point Q' are the fifth transistor Tr5, the eighth transistor Tr8 and the thirteenth transistor Tr13.

A control terminal of the fifth transistor Tr5 is connected to the first input terminal IN1, an input terminal thereof is connected to the second contact point Q', and an output terminal thereof is connected to the second voltage input terminal Vin2. Therefore, the fifth transistor serves a function for lowering the voltage of the second contact point Q to the second low voltage Vss2 according to the transmission signal CR of the previous stage.

The eighth transistor Tr8 has a control terminal connected to the transmission signal output terminal CRout of the present stage, an input terminal connected to the second contact point Q', and an output terminal connected to the first voltage input terminal Vin1. Therefore, the eighth transistor may lower the voltage of the second contact point Q' to the first low voltage Vss1 according to the transmission signal CR of the present stage.

The thirteenth transistor Tr13 has a control terminal connected to the transmission signal output terminal CRout of the present stage, an input terminal connected to the output terminal of the twelfth transistor Tr12 of the pull-up driver 512, and an output terminal connected to the first voltage input terminal Vin1. Accordingly, the thirteenth transistor Tr13 lowers an internal electric potential of the pull-up driver 512 according to the transmission signal CR of the present stage to the first low voltage Vss1 to lower the voltage of the contact point Q' connected to the pull-up driver 512 to the first low voltage Vss1. That is, the thirteenth transistor Tr13 may discharge internal electric charge of the pull-up driver 512 to the side of the first low voltage Vss1. However, since the pull-up driver 512 is also connected to the second contact point Q', the thirteenth transistor Tr13 prevents the voltage of the second contact point Q' form being pulled up, thereby assisting in lowering the voltage of the second contact point Q' to the first low voltage Vss1.

Transistors that lower a voltage output as the transmission signal CR in the pull-down driver 515 will now be described. The transistors that lower the voltage output as the transmission signal CR are the eleventh transistor Tr11 and the seventeenth transistor Tr17.

The eleventh transistor Tr11 has a control terminal connected to the second contact point Q', an input terminal connected to the transmission signal output terminal CRout, and an output terminal connected to the second voltage input terminal Vin2. Accordingly, when the voltage of the second contact point Q' is at a high level, the voltage of the transmission signal output terminal CRout is lowered to the second low voltage Vss2, and thus the transmission signal CR changes to the low level.

The seventeenth transistor Tr17 has a control terminal connected to the second input terminal IN2, an input terminal connected to the transmission signal output terminal CRout, and an output terminal connected to the second voltage input terminal Vin2. Accordingly, the seventeenth transistor Tr17 may lower the voltage of the transmission signal output terminal CRout to the second low voltage Vss2 according to the transmission signal CR of the next stage. The seventeenth transistor Tr17 is configured to operate on the basis of the transmission signal CR of the next stage to assist the eleventh transistor Tr11.

Transistors that lower the voltage to be output to the gate line in the pull-down driver 515 will now be described. The transistors for lowering the voltage output to the gate line are the second transistor Tr2 and the third transistor Tr3.

The second transistor Tr2 has a control terminal connected to the second input terminal IN2, an input terminal connected to the gate voltage output terminal OUT, and an output terminal connected to the first voltage input terminal Vin1. Accordingly, when the transmission signal CR of the next stage is output, the second transistor Tr2 changes the gate voltage to be output to the first low voltage Vss1.

The third transistor Tr3 has a control terminal connected to the second contact point Q', an input terminal connected to the gate voltage output terminal OUT, and an output terminal connected to the first voltage input terminal Vin1. Accordingly, when the voltage of the second contact point Q' is at the high level, the third transistor Tr3 changes the gate voltage to be output to the first low voltage Vss1.

In the pull-down driver 515, the transmission signal CR to be output and the voltage to be output may be lowered by two transistors according to the transmission signal CR of the next stage input to the second input terminal IN2 or according to the voltage of the second contact point Q' at the same timing. The voltage output as the transmission signal CR is lowered to the second low voltage Vss2, and the gate-off voltage is lowered to the first low voltage Vss1 such that the voltage of the transmission signal CR at the low level is lower than the gate-off voltage.

The pull-down driver 515 lowers only the gate voltage output terminal OUT to the first low voltage Vss1 and lowers the first contact point Q and the transmission signal output terminal CRout to the second low voltage Vss2 lower than the first low voltage Vss1. Accordingly, even though the gate-on voltage and the voltage of the transmission signal CR at the high level may have the same voltage, the gate-off voltage and the voltage of the transmission signal CR at the low level have different voltage. That is, the gate-off voltage has the first low voltage Vss1 and the low voltage value of the transmission signal CR has the second low voltage Vss2. In an exemplary embodiment, the second contact point Q' is lowered to the first low voltage Vss1 by the eighth transistor Tr8 and the thirteenth transistor Tr13 and is lowered to the second low voltage Vss2 by the fifth transistor Tr5.

The gate voltage and the transmission signal CR may have various values. In an exemplary embodiment, the gate-on voltage may have 25 V, the gate-off voltage and the first low voltage Vss1 may have −5 V, the high voltage of the transmission signal CR may have 25 V, and the low voltage of the transmission signal CR and the second low voltage Vss2 may have −10 V, for example.

Consequently, in one stage SR, the transmission signal generator 513 and the output unit 514 operate by the voltage of the first contact point Q to output the high voltage of the transmission signal CR and the gate-on voltage. By the transmission signals CR of the previous stage, the next stage and the stage after the next stage, the transmission signal CR is lowered from the high voltage to the second low voltage Vss2 and the gate-on voltage is lowered to the first low voltage Vss1 to become the gate-off voltage. Here, to drive one stage SR with low power consumption, the corresponding stage lowers the voltage of the first contact point Q to the second low voltage Vss2 by not only the transmission signal of the next stage but also the transmission signal CR of the stage after the next stage. Since the second low voltage Vss2 is lower than the first low voltage Vss1 that is the gate-off voltage, even though the voltage of the transmission signal CR applied by another stage varies due to a ripple or noise included therein, the second low voltage Vss2 is substantially low such that leakage current is not generated in the transistors included in the corresponding stage. Therefore, the power consumption may be substantially reduced.

The present invention should not be construed as being limited to the exemplary embodiments set forth herein. Rather, these exemplary embodiments are provided so that this disclosure will be thorough and complete and will fully convey the concept of the present invention to those skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A three-dimensional image display comprising:
   a signal controller which receives two-dimensional image information and three-dimensional image information and generates control signals based on the two-dimensional image information and the three-dimensional image information;
   a clock generator which receives the control signals from the signal controller and generates a first clock signal corresponding to the three-dimensional image information and a second clock signal corresponding to the two-dimensional image information; and
   a gate driver which generates a gate-on voltage based on at least one of the first clock signal and the second clock signal,
   wherein a frequency of the second clock signal is lower than a frequency of the first clock signal, and an amplitude of the second clock signal is less than an amplitude of the first clock signal, and
   wherein
   the control signals includes a first clock enable signal, a second clock enable signal, a first clock control signal and a second clock control signal,
   the clock generator generates the first clock signal based on the first clock enable signal and the first clock control signal and generates the second clock signal based on the second clock enable signal and the second clock control signal, and
   a rising edge of the first clock enable signal occurs when the first clock control signal has a low level value, and a rising edge of the second clock enable signal occurs when the second clock control signal has a low level value, and
   the electric charge sharing time of the first clock signal corresponds to a time period between a falling edge of the first clock control signal and a rising edge of the first clock enable signal, and the electric charge sharing time of the second clock signal corresponds to a time period between a falling edge of the second clock control signal and a rising edge of the second clock enable signal.

2. The three-dimensional image display of claim 1, wherein
   the signal controller receives a three-dimensional enable signal which is maintained at a high level while the signal controller receives the three-dimensional image information.

3. The three-dimensional image display of claim 1, wherein
   a frequency of the second clock control signal is lower than a frequency of the first clock control signal.

4. The three-dimensional image display of claim 3, wherein
   only one of the first clock enable signal and the second clock enable signal has a high level value during one time interval.

5. The three-dimensional image display of claim 3, wherein
   an electric charge sharing time of the first clock signal and an electric charge sharing time of the second clock signal are substantially identical to each other.

6. The three-dimensional image display of claim 5, wherein
   a ratio of a first falling time of the first clock control signal to a first rising time of the first clock control signal is greater than a ratio of a second falling time of the second clock control signal to a second rising time of the second clock control signal.

7. The three-dimensional image display of claim 1, wherein
   the two-dimensional image information comprise a still image information and a moving image information,
   the second clock signal corresponds to the moving image information,
   the clock generator further generates a third clock signal corresponding to the still image information, and
   a frequency of the third clock signal is lower than a frequency of the second clock signal.

8. The three-dimensional image display of claim 7, wherein
   the control signals includes a first clock enable signal, a second clock enable signal, a third clock enable signal, a first clock control signal, a second clock control signal and a third clock control signal, the clock generator generates the first clock signal based on the first clock enable signal and the first clock control signal, generates the second clock signal based on the second clock enable signal and the second clock control signal, and generates the third clock signal based on the third clock enable signal and the third clock control signal, and wherein a frequency of the second clock control signal is lower than a frequency of the first clock control signal.

9. The three-dimensional image display of claim 8, wherein only one of the first clock enable signal, the second clock enable signal and the third clock enable signal has a high level value during one time interval.

10. The three-dimensional image display of claim 8, wherein an amplitude of the second clock signal and an amplitude of the third clock signal are substantially identical to each other.

11. The three-dimensional image display of claim 8, wherein an amplitude of the third clock signal is less than an amplitude of the second clock signal.

12. The three-dimensional image display of claim 8, wherein an electric charge sharing timing of the first clock signal, an electric charge sharing time of the second clock signal and an electric charge sharing time of the third clock signal are substantially identical to each other.

13. The three-dimensional image display of claim 12, wherein a rising edge of the first clock enable signal occurs when the first clock control signal has a low level value, a rising edge of the second clock enable signal occurs when the second clock control signal has a low level value, and a rising edge of the third clock enable signal occurs when the third clock control signal has a low level value, and the electric charge sharing time of the first clock signal corresponds to a time period between a falling edge of the first clock control signal and a rising edge of the first clock enable signal, the electric charge sharing time of the second clock signal corresponds to a time period between a falling edge of the second clock control signal and a rising edge of the second clock enable signal, and the electric charge sharing time of the third clock signal corresponds to a time period between a falling edge of the third clock control signal and a rising edge of the third clock enable signal.

14. The three-dimensional image display of claim 12, wherein a ratio of a first falling time of the first clock control signal to a first rising time of the first clock control signal is greater than a ratio of a second falling time of the second clock control signal to a second rising time of the second clock control signal, and a ratio of a second falling time of the second clock control signal to a second rising time of the second clock control signal is greater than a ratio of a third falling time of the third clock control signal to a third rising time of the third clock control signal.

15. The three-dimensional image display of claim 1, wherein the clock generator comprises a first voltage regulator which determines an amplitude of the first clock signal and a second voltage regulator which determines an amplitude of the second clock signal.

16. The three-dimensional image display of claim 15, wherein the first voltage regulator comprises a first resistor and a first capacitor, and the second voltage regulator comprises a second resistor and a second capacitor.

17. The three-dimensional image display of claim 16, wherein a resistance of the first resistor is different from a resistance of the second resistor.

18. The three-dimensional image display of claim 1, further comprising a plurality of gate lines, wherein the gate driver comprises a plurality of stages, and each stage of the plurality of stages is connected to an end of each of the plurality of gate lines, respectively, wherein the plurality of stages are aligned in a first direction, and wherein the gate driver is integrated on a substrate.

19. The three-dimensional image display of claim 18, wherein each stage of the plurality of stages receives a first low voltage, a second low voltage, the at least one of the first clock signal and the second clock signal, a transmission signal of at least one of previous stages of the plurality of stages and transmission signals of at least two of subsequent stages of the plurality of stages, and outputs a gate voltage having the first low voltage as a gate-off voltage.

20. The three-dimensional image display of claim 19, wherein the second low voltage is a voltage when the transmission signal has a low level.

* * * * *